United States Patent [19]

Krueger

[11] 4,019,992
[45] Apr. 26, 1977

[54] CORROSION INHIBITORS FOR ABSORPTION REFRIGERATION SYSTEMS

[75] Inventor: Robert Harold Krueger, Palatine, Ill.

[73] Assignee: Borg-Warner Corporation, Chicago, Ill.

[22] Filed: Nov. 3, 1975

[21] Appl. No.: 628,270

[52] U.S. Cl. .................................. 252/68; 62/112; 62/114; 62/DIG. 20; 252/67; 252/387; 252/388; 252/390

[51] Int. Cl.² .......................................... C09K 5/04

[58] Field of Search .............. 252/68, 67, 387, 390, 252/388 R; 62/112, 114, DIG. 20

[56] References Cited

UNITED STATES PATENTS

| 3,478,530 | 11/1969 | Aronson | 62/112 |
|---|---|---|---|
| 3,555,841 | 1/1971 | Modahl et al. | 252/67 |
| 3,580,759 | 5/1971 | Albertson et al. | 252/68 |
| 3,609,086 | 9/1971 | Modahl et al. | 252/68 |
| 3,609,087 | 9/1971 | Chi et al. | 252/68 |

OTHER PUBLICATIONS

Aker et al., "An Evaluation of Alcohol-Salt Mixture as Absorption Refrigeration Solutions", ASHRAE Journal, vol. 7, May 1965.

*Primary Examiner*—Mayer Weinblatt
*Assistant Examiner*—John D. Smith
*Attorney, Agent, or Firm*—Richard J. Schlott

[57] ABSTRACT

Working fluid compositions for absorption refrigeration systems comprising alcohol, lithium bromide, zinc bromide and a synergistic mixture of arsenic trioxide and the sodium salt of ethylenediaminetetraacetic acid which are markedly inhibited in corrosion of ferrous metals, and a method for inhibiting the corrosion of ferrous metals by alcohol-lithium bromide-zinc bromide mixture by adding a synergistic combination of arsenic trioxide and ethylenediaminetetraacetic acid.

2 Claims, No Drawings

CORROSION INHIBITORS FOR ABSORPTION REFRIGERATION SYSTEMS

BACKGROUND OF THE INVENTION

This invention relates to working fluids for use in absorption refrigeration systems. More particularly, this invention relates to compositions useful as absorption refrigeration working fluids which are inhibited in the corrosion of the internal metal surfaces of the system, and to a method for retarding corrosion of ferrous metal surfaces by concentrated salt solutions.

The working fluids employed in most large commercial absorption refrigeration systems are concentrated aqueous solutions of lithium bromide. Corrosion inhibitors such as arsenic trioxide have been successfully employed in these aqueous systems to prevent corrosion of the system at working temperatures of 250° F. and higher. Systems employing these aqueous working fluids are widely known, and are further disclosed and described, for example, in U.S. Pat. No. 3,555,841.

Alternative working fluids have also been sought which would permit the use of higher absorber temperatures while maintaining the same low vapor pressure and refrigerant temperatures. Aqueous systems generally require that large volumes of water be employed to externally cool the absorber since the absorber must be maintained at a temperature sufficiently low (at constant pressure) to prevent crystallization of the working fluid. An alternative working fluid which could operate at a higher temperature would permit the use of air as the external coolant, thereby eliminating the need for large volumes of chilled water and/or cooling towers. Among the possible compositions useful as alternative working fluids are those based on alcohol solutions of lithium bromide or mixtures of lithium bromide and zinc bromide such as those disclosed by Hainsworth in "Refrigerants and Absorbants", *Refrigeration Engineering* 48 97 (1944). These working fluids would appear likely to permit the use of higher absorber temperatures and consequently allow replacement of the external water coolant by air.

A further problem which would be rectified by the use of alcohol-based coolants is that of freezing. Water-based working fluids tend to freeze up at environmental temperatures commonly encountered in the field. Alcohol-based fluids would prevent such freeze-ups during warehousing, and additionally allow the absorber units to be installed outside the structures being refrigerated or cooled. It is thought that such systems would have utility in residential as well as commercial applications, and would permit the design of both fuel-fired and solar-heated devices.

Alcohol-lithium bromide-zinc bromide working fluids are quite corrosive to the ferrous metals commonly employed in the construction of absorption refrigeration systems. While the use of exotic metals may be used to overcome corrosion problems, such constructions are neither economical nor practical for wide application, and the use of alcohol-lithium bromide-zinc bromide working fluids would thus be severely limited. An effective corrosion inhibitor for these working fluids is thus clearly needed if they are to find application in practical absorption refrigeration systems.

SUMMARY OF THE INVENTION

It has now been found that concentrated solutions of lithium bromide and zinc bromide in methanol are inhibited in their corrosion of ferrous metals by the addition thereto of a synergistic combination of ethylenediaminetetraacetic acid (EDTA) and arsenic trioxide. More particularly, methanol solutions containing from 48 to 75% by weight of a 2/1 (mole ratio) mixture of lithium bromide and zinc bromide to which is added from 0.2 to about 1% by weight of a 1:1 mixture of EDTA and arsenic trioxide are markedly inhibited toward corrosion of ferrous metals.

EXAMPLES

A test procedure was devised to provide an accelerated corrosion test for evaluation purposes. Metal coupons measuring 3¼ × ¾ × ⅛ inches were first polished with No. 500 emery paper, then degreased in methanol and air dried. The metal samples were weighed, then placed in a 200 ml. round bottom flask containing 100 ml. of a methanol-zinc bromide-lithium bromide solution containing 32.5% by weight LiBr, 42.5% by weight $ZnBr_2$ and 25% by weight methanol such that the samples were half immersed. The mixture was heated at reflux (340° F.) for 4 days, then cooled. The metal samples were then cleaned, dried and re-weighed to determine the metal loss. The weight loss data for mixtures with and without added corrosion inhibitors are given in Table I.

TABLE I.

Corrosion Rate (in/mils per year) of Metal Samples In Refluxing (340 F.) MeOH - LiBr - $ZnBr_2$ Mixtures

| Example No. | Metal | Inhibitor | Inhibitor % by weight | Metal Loss (MPY) |
|---|---|---|---|---|
| 1 (control) | 1018 Steel | None | | 17.8 |
| 2 | 1018 Steel | $As_2O_3$ | 0.4 | 5.4 |
| 3 | 1018 Steel | EDTA (Na salt) | 0.4 | 5.9 |
| 4 | 1018 Steel | $As_2O_3$ EDTA (Na salt) | 0.2 0.2 | 3.5 |
| 5 | 1018 Steel | $Sb_2O_3$ | 0.4 | 30.4 |
| 6 | 1018 Steel | Tetramethyl Ammonium Bromide | 0.4 | 19.0 |

Thus it will be apparent that the rapid corrosion of 1018 mild steel in alcohol-LiBr-$ZnBr_2$ solutions is retarded by about ⅔ by the addition of either $As_2O_3$ or EDTA. When the two are used together, however, a synergistic improvement occurs, and the corrosion rate is lowered to approximately 20% of the uninhibited system. That the inhibition of corrosion for these alcohol-based working fluids is unexpected is shown by comparative tests with corrosion inhibitors commonly employed with aqueous systems, as in Example 5, wherein the corrosion rate is doubled by the addition of antimony oxide and in Example 6, where the corrosion rate is somewhat increased by the addition of tetramethyl ammonium bromide. Thus it will be seen that the behavior of corrosion inhibitors in alcohol-based systems cannot be extrapolated from data for aqueous systems. Moreover, the synergistic interaction of the combination of $As_2O_3$ and EDTA is completely unexpected and unpredicted.

The invention will thus be seen to be a working fluid for use in absorption refrigeration systems which has been inhibited toward corrosion of ferrous metal surfaces by the presence of a synergistic mixture of arsenic trioxide and the sodium salt of ethylenediaminetetracetic acid. As a method for inhibiting corrosion by alcohol-$LiBr$-$ZnBr_2$ mixtures, the addition of a synergistic combination of arsenic trioxide and the sodium salt of ethylenediaminetetracetic acid will be beneficial over a wide absorbant concentration range.

Further modifications of the invention will be apparent to those skilled in the art which do not depart from the spirit and scope of the invention. The working examples have been provided solely by way of illustration and not limitation, and the scope of the invention is to be construed as broadly as set forth in the following claims.

I claim:

1. An anhydrous working fluid composition for use in absorption refrigeration systems comprising from 52 to 25% by weight alcohol, and from 48 to 75% by weight of a 2/1 mole ratio lithium bromide/zinc bromide mixture and from 0.2 to about 1% by weight based on said working fluid of a 1:1 mixture of the sodium salt of ethylenediamine tetraacetic acid and arsenic trioxide.

2. A method for inhibiting the corrosion of ferrous metal surfaces in absorption refrigeration systems using as the working fluid an unhydrous solution of lithium bromide and zinc bromide in alcohol comprising adding to the working fluid an effective amount of a 1:1 mixture of the sodium salt of ethylenediaminetetraacetic acid and arsenic trioxide.

* * * * *